Apr. 24, 1923.
F. C. LEE
FISHING ROD HANDLE
Filed Nov. 9, 1922
1,452,808
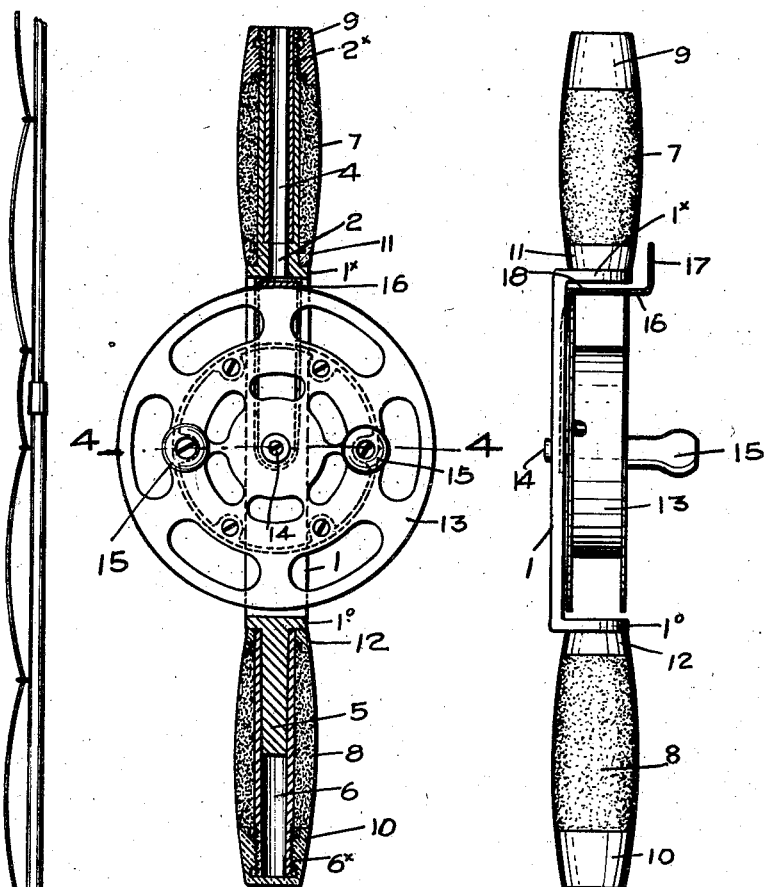
FIG.1.  FIG.2.  FIG.3.
FIG.4.
INVENTOR
FREDERICK C. LEE,
BY
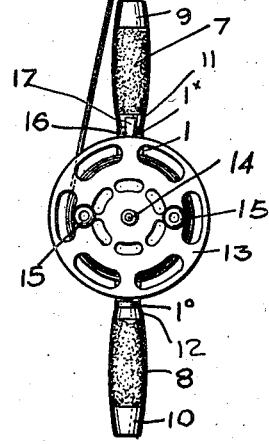
ATTORNEYS Patented Apr. 24, 1923.

1,452,808

UNITED STATES PATENT OFFICE.

FREDERICK CHARLES LEE, OF TORONTO, ONTARIO, CANADA.

FISHING-ROD HANDLE.

Application filed November 9, 1922. Serial No. 599,922.

*To all whom it may concern:*

Be it known that I, FREDERICK CHARLES LEE, a subject of the King of Great Britain, and a resident of the city of Toronto, in the county of York, in the Province of Ontario, Canada, have invented certain new and useful Improvements in Fishing-Rod Handles, of which the following is the specification.

My invention relates to improvements in fishing rod handles and the object of the invention is to devise a simple, strong and durable construction whereby the reel of a fishing rod may be set in central alignment with the longitudinal axis of the handle so that the line will have a direct draw longitudinally of the fishing rod and it consists essentially of an offset bracket broad U-shaped in form with short arms, tubular portions extending from each of said arms and forming an integral part thereof, such tubular portions having their axes coinciding with the axis of the fishing rod, and a reel turnably mounted within the bracket so that the centre of the reel between the side faces thereof is in central alignment with the longitudinal axis of the fishing rod as hereinafter more particularly explained by the following specification.

Fig. 1 is a general view of a fishing rod showing my device applied thereto looking at the face of the reel.

Fig. 2 is a sectional view through the handle showing the reel in full.

Fig. 3 is a side elevation of the parts shown in Fig. 2.

Fig. 4 is a cross sectional view on line 4—4, Fig. 2.

In the drawings like characters of reference indicate corresponding parts in each figure.

1 indicates a bracket which is broad U-shaped in form and provided with short arms $1^x$ and $1^o$. 2 is a tubular stud extending outward from the arm $1^x$ and adapted to receive the inner or butt end of the fishing rod 3 as illustrated in Fig. 1. The sleeve 2 may be provided with an internal bushing sleeve 4 formed of brass or any other suitable material into which the butt end of the fishing rod 3 is forced.

5 is a stud portion extending laterally from the arm $1^o$ upon which is secured a sleeve 6. Although I have shown the sleeve 6 as secured to the stud 5 it will, of course, be understood that such stud may be dispensed with and the sleeve 6 made an integral part of the arm $1^o$. The outer end of the sleeves 2 and 6 are provided with threaded portions $2^x$ and $6^x$. 7 and 8 are handle grips surrounding the sleeves 2 and 6 respectively and secured thereon by holding caps 9 and 10 and 11 and 12. The outer caps 9 and 10 are internally threaded to engage the threaded portions $2^x$ and $6^x$ respectively.

13 is a reel mounted upon the stud 14 located centrally of the main portion of the bracket 1. 15 are the handles by which the reel is turned. 16 is a brake formed of a strip of spring metal, the finger piece 17 extending over the inner end of the handle grip 7, the intermediate portion 18 adapted to bear against the periphery of the reel so as to control the same and prevent its turning when desired.

When it is desired that the reel run free all it is necessary to do is that the operator press the finger grip 17 with the little finger of the hand gripping the handle grip 7 which is adjacent to the finger grip 17 so as to depress it and spring the intermediate portion 18 out of contact with the reel.

From this description it will be seen that I have devised a very simple construction which will be very strong and durable and yet enable the reel to be mounted in the handle so that the fishing line will draw directly longitudinally of the rod.

What I claim as my invention is:

A fishing rod handle comprising a broad U-shaped central member having short arms, a tubular portion carried by one of said arms and a stud by the other of said arms, said portions extending laterally outward from each arm in central alignment one with the other, handle grips secured upon each of the said portions, and a reel mounted within the bracket between the handle grips and arms so as to be in central alignment with the handle grips.

FREDERICK CHARLES LEE.